United States Patent [19]
Nemoto et al.

[11] Patent Number: 5,942,885
[45] Date of Patent: Aug. 24, 1999

[54] POWER COMPENSATING DEVICE FOR BATTERY

[75] Inventors: Kunio Nemoto; Masaaki Imamura, both of Kanagawa-ken, Japan

[73] Assignee: Elna Co., Ltd., Kanagawa-ken, Japan

[21] Appl. No.: 09/152,325

[22] Filed: Sep. 14, 1998

[30] Foreign Application Priority Data

Aug. 11, 1998 [JP] Japan .................................. 10-227399

[51] Int. Cl.⁶ ....................................................... G05F 1/56
[52] U.S. Cl. ......................................................... 323/282
[58] Field of Search .................................. 323/220, 223, 323/226, 273, 282, 284, 285; 320/30, 39, 49

[56] References Cited

U.S. PATENT DOCUMENTS 5,252,906 10/1993 Busson ........................................ 320/22
5,648,715 7/1997 Patino et al. ............................... 320/23
5,751,140 5/1998 Canter ...................................... 323/282

*Primary Examiner*—Matthew Nguyen
*Attorney, Agent, or Firm*—McDermott, Will & Emery

[57] ABSTRACT

The power compensating device for battery by this invention comprises a battery 10, a cable 13 that connects this battery 10 to a load 11, a compensating capacitor 12 inserted into the input side of the load 11, a voltage detecting circuit 27 that detects the fluctuation of the input voltage to the load 11, a comparison circuit 28 that compares detected value with referential value, a switching circuit 25 to be controlled by a comparison output, and an auxiliary capacitor 26 connected in parallel, via the switching circuit 25, with the compensating capacitor 12 to sufficiently suppress voltage drop. To this power compensating device it is possible to add a display circuit 29 that displays multistagedly the voltage fluctuation to know visually the effects of voltage fluctuation suppression.

19 Claims, 4 Drawing Sheets

POWER COMPENSATING DEVICE FOR BATTERY

BACKGROUND OF THE INVENTION

1. Field of the Invention

The present invention relates to a power compensating device that makes up for any extreme reduction in the voltage of the batteries loaded, for example, on cars and small vessels due to any large fluctuation in load.

2. Description of the Prior Art

In the event that such a large load 11 as a car amplifier and speaker of the order of several hundreds of watts is connected to the battery 10 with capacity equivalent to those loaded, for example, on passenger cars via a long 2 to 5 m cable 13 as shown in FIG. 6, a sharp voltage drop may be caused by the resistivity of the cable 13, if a large current flows into the large load 11. Suppose a large current, for example, of 20 to 30 A or even higher flows into an ordinary car battery 10 of Vi (12 V, for instance) at the time of t1 as shown in FIG. 5, and the current returns to its original value at the time t2 due to an extreme fluctuation in voltage. If there exists no compensating capacitor 8, a temporary voltage drop V1 of 10 to 20% occurs against the supply voltage Vi as shown by the dotted characteristic lines in FIG. 5, thereby causing short of power, reduction in tone quality and distortion.

To solve this problematical point of temporary excessive voltage drop, conventionally a compensating capacitor 8 has been inserted between the power supply input terminals of the load 11 as shown in FIG. 6.

When in such a circuitry a large current flows into the load 11 at the time t1 as in FIG. 5 and a sharp voltage drop is about to occur, the energy accumulated in the compensating capacitor 8 is released to decrease the voltage relatively gently down to V2 as shown by the characteristic two-dot chain curve in FIG. 5, and further the same voltage rises up also gently from the time t2 to its original level.

The prior art was problematical, however, in that though this insertion of the compensating capacitor 8 allows for a voltage drop suppression effect to a certain extent, the sole compensating capacitor 8 requires a substantially long cable 13 to connect the battery 10 and load 11. This long cable tends to reduce the voltage. To make up for this voltage drop, the electric charge stored in the compensating capacitor 8 is consumed making it insufficient to suppress the fluctuation in voltage.

The primary purpose of this invention is to provide a power compensating device for battery that can control enough the extreme voltage drop by a comparatively simple circuitry.

The second purpose of this invention is to provide a device that can readily set a target value in terms of the voltage fluctuation to be controlled and the size of load depending on whether or not any referential voltage is to be selected from among plural settings.

The third objective of this invention is to provide a device that allows us to know visually the suppression effects of multistaged fluctuation in voltage.

The fourth objective of this invention is to supply a device that allows us to set the voltage compensating value, crude or fine, upon request.

The fifth purpose of this invention is to reduce as far as possible the internal resistance of compensating and auxiliary capacitors even if their capacities may be the same.

Other and further objects, effects and advantages of this invention will appear more fully from the following optimal embodiments.

BRIEF SUMMARY OF THE INVENTION

The present invention relates to a power compensating device for battery, characterized in that it comprises a battery 10, a cable 13 that connects this battery 10 to a load 11, a compensating capacitor 12 inserted into the input side of the load 11, a voltage detecting circuit 27 that detects the fluctuation of the in put voltage to the load 11, a comparison circuit 28 that compares detected value with referential value, a switching circuit 25 to be controlled by a comparison output, and an auxiliary capacitor 26 connected in parallel, via the switching circuit 25, with the compensating capacitor 12 to sufficiently suppress voltage drop.

Said comparison circuit 28 consists of the plural voltage comparators that compare multistagedly the voltage drop, to which we may add the display circuits that display multistagedly the voltage fluctuation In the foregoing configuration, sole compensating capacitor may make up for the power if the variation in voltage falls within the settings.

If the voltage variation exceeds the settings, the switching circuit is controlled detecting the excess to connect the auxiliary capacitor in parallel with the compensating capacitor.

Then, the electric charge of the auxiliary capacitor and compensating capacitor becomes supplied simultaneously with the voltage fluctuation improved into about the half of the case with the compensating capacitor only.

Thus, the power compensating device for battery consisting of relatively simple circuits according to this invention allows for satisfactory control of the excessive voltage drop.

Further, the addition of the multistage display circuit enables to know visually the suppression effects of multistaged fluctuation in voltage.

DETAILED DESCRIPTION

Figure 1:
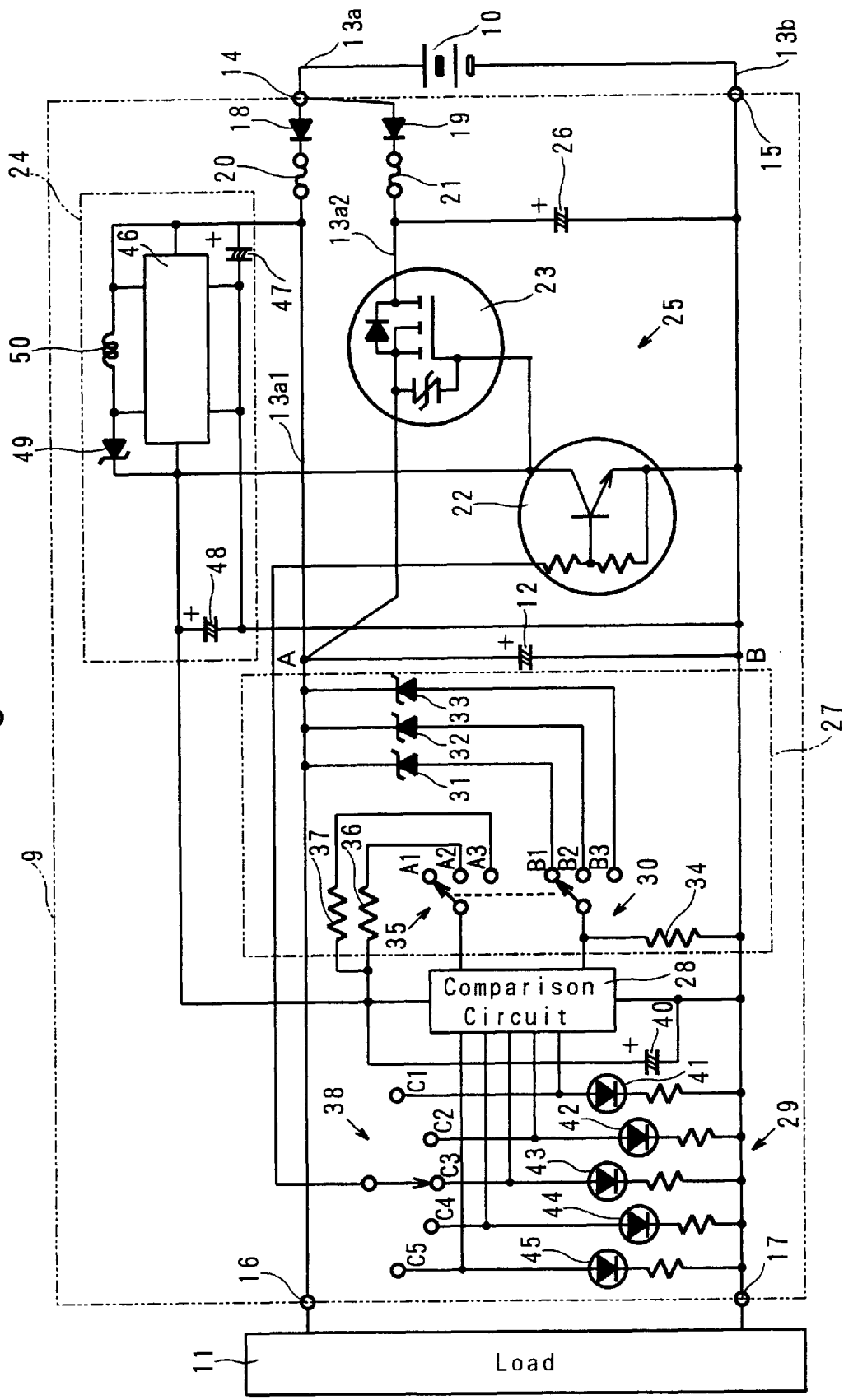
FIG. 1 is an electric circuit diagram showing the first embodiment of the power compensating device for battery by this invention.

Referring now to the drawings, we will describe hereunder an embodiment of the power compensating device for battery by this invention.

In FIG. 1 showing the first embodiment of this invention, the numeral 10 represents a battery such as used, for example, in automobiles, and 11 represents such loads as audio amplifier and speaker to be loaded on some vehicles.

These battery 10 and load 11 are connected with each other by a positive side cable 13a and negative side cable 13b, in between which comes the power compensating device for battery 9 by this invention.

The power compensating device for battery 9 by this invention comprises the compensating capacitor 12 as inserted between the point A midway to the positive side cable 13a and the point B midway to the negative side cable 13b, the voltage detecting circuit 27 which detects voltage fluctuation and sets referential voltage, the comparison circuit 28 that compares the voltage detected by this voltage detecting circuit 27, with the referential voltage, the switching circuit 25 to be on-off controlled by the output of the comparison circuit 28, the auxiliary capacitor 26 to be inserted in parallel with the compensating capacitor 12 by the switching circuit 25, the display circuit 29 that displays multistagedly the degree of voltage change, and the stabilized power supply circuit 24 that provides the comparison circuit 28 and switching circuit 25 with stabilized power source.

The capacitance ratio of the compensating capacitor 12 to auxiliary capacitor 26 is set to the order of 7:3 for example.

The foregoing switching circuit 25 consists of the first switching element 22 and the second switching element 23 such as MOSFET (metal oxide semiconductor field effect transistor), SCR (semiconductor controlled rectifier) and bipolar transistor.

The part between the positive terminal 14 and point A in the foregoing positive side cable 13a is branched into two paths, the first cable 13a1 and the second cable 13a2.

Inserted into the first cable 13a1 are the first recovery diode 18 and fuse 20, while the first recovery diode 19, fuse 21, and the second switching element 21 are inserted into the second cable 13a2.

The above-mentioned voltage detecting circuit 27 consists of the circuit portion that sets the detection value of voltage fluctuation depending on the size of load (100 W, 500 W, 1 kW for example) and the circuit portion that sets the referential value. Said circuit portion setting the detection value of voltage fluctuation comprises the detection voltage changeover switch that has three Zener diodes 31, 32, and 33 as well as three contacts B1, B2, and B3 in the case, for example, of three-staged setting, and the resistance 34, while the circuit portion setting the referential value comprises the resistance 36 and 37 as well as the referential voltage changeover switch 35 that has three contacts A1, A2 and A3.

These switches 30 and 35 are toggled into each other in reciprocating interlocking.

Figure 2:
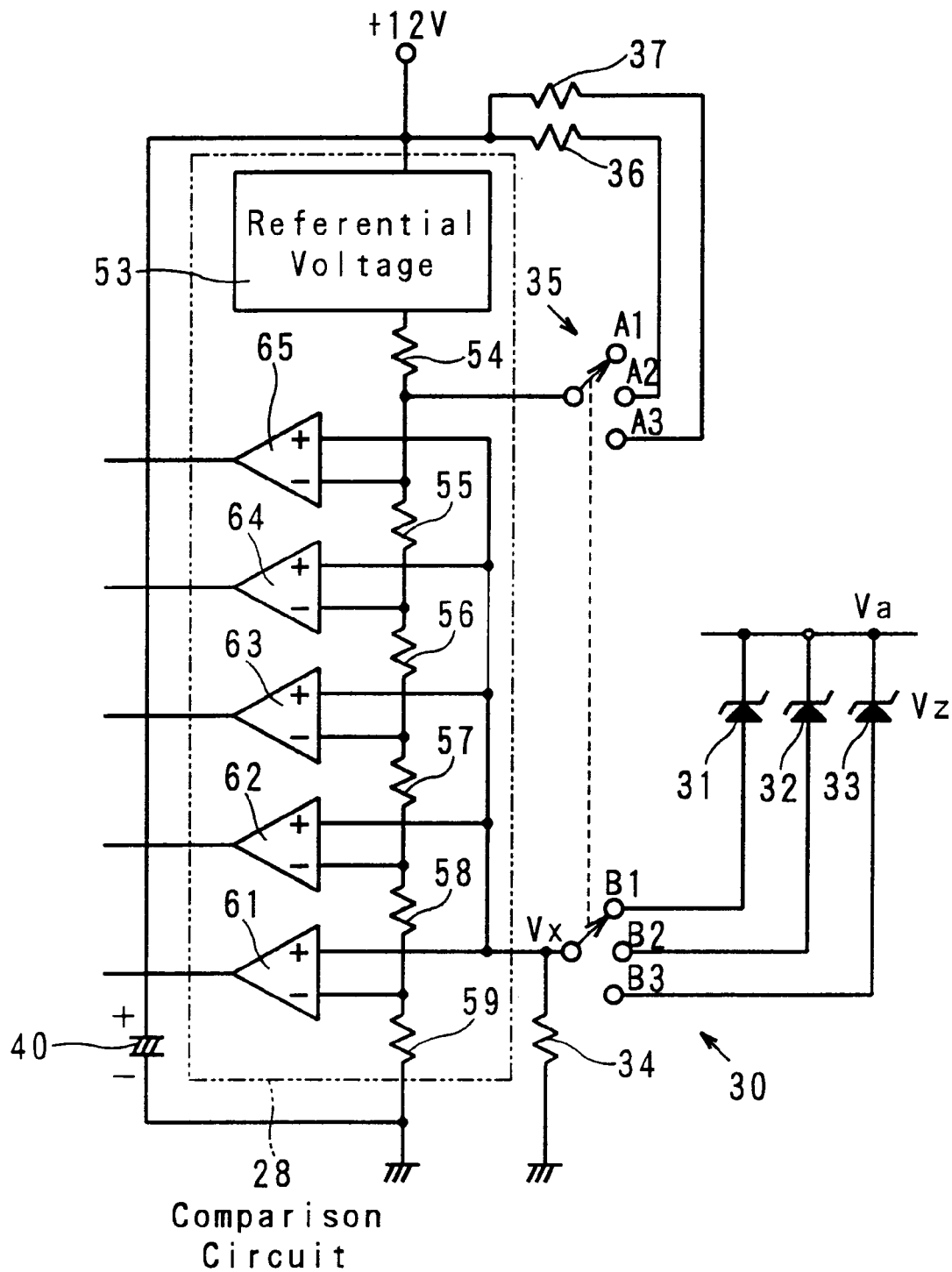
FIG. 2 is a concrete circuit diagram that shows up an embodiment of the comparison circuit 28 shown in FIG. 1.

As shown in FIG. 2, the comparison circuit 28 incorporates plural (five in this case) voltage comparators 61, 62, 63, 64, and 65. Inserted between the output terminal and the ground in the foregoing stabilized power supply circuit 24 are the referential voltage generating circuit 53 and the series circuit with resistances 54, 55, 56, 57, 58, and 59.

The respective nodes of these resistances 54, 55, 56, 57, 58, and 59 are connected to the respective negative terminals of the voltage comparators 61, 62, 63, 64, and 65. Further, the common terminals of the detection voltage changeover switch 30 are connected to the positive terminals of the voltage comparators 61, 62, 63, 64, and 65.

Applied to these five voltage comparators 61, 62, 63, 64, and 65 is five stages of referential voltage.

More concretely, when the A1 of the referential voltage changeover switch 35 and the B1 of the detection voltage changeover switch 30 are turn-over jointed to, the referential voltage Vr, namely 0.2 V, 0.4 V, 0.6 V, 0.8 V and 1.0 V is applied at 0.2 V intervals to the negative terminals of the five voltage comparators 61, 62, 63, 64, and 65 in the comparison circuit 28. Letting Vz11 (=1.0 V) the Zener voltage of the Zener diode 31 and Va the detected voltage at the point A, Vx=Va−Vz1 is applied, as the output signal voltage, to the positive terminals of the voltage comparators 61, 62, 63, 64, and 65.

Similarly, when the A2 and B2 are changed over to, 0.3 V, 0.6 V, 0.9 V, 1.2 V and 1.5 V is applied at 0.3 V intervals to the negative terminals of the voltage comparators 61, 62, 63, 64, and 65. Letting Vz2 (=10.5 V) the Zener voltage of the Zener diode 32 and Va the detected voltage at the point A, Vx=Va−Vz2 is applied to the positive terminals of the voltage comparators 61, 62, 63, 64, and 65.

When, further, the A3 and B3 are changed over to, 0.6 V, 1.2 V, 1.8 V, 2.4 V, and 3.0 V is applied at 0.6 V intervals to the negative terminals of the voltage comparators 61, 62, 63, 64, and 65. Letting Vz3 (=9.0 V) the Zener voltage of the Zener diode 33 and Va the detected voltage at the point A, Vx=Va−Vz3 is applied to the positive terminals of the voltage comparators 61, 62, 63, 64, and 65.

Thus, the referential voltage is determined depending on which is to be selected out of the contacts A1, A2, and A3 by the referential voltage changeover switch 35, and out of the contacts B1, B2, and B3 by the detection voltage changeover switch 30.

Said display circuit 29 having as many (five in this case) indicating lamps 41, 42, 43, 44, and 45 as the foregoing voltage comparators 61, 62, 63, 64, and 65, outputs when the voltage Vx as detected by the voltage detecting circuit 27 comes lower than the referential voltage Vr of the voltage comparators 61 to 65 at the comparison circuit 28.

Connected respectively to the output sides of the voltage comparators 61 to 65 are the contacts C1 to C5 of the operating point changeover switch 38.

Any one of these contacts C1 to C5 is selectively connected to the first switching element 22 of the switching circuit 25 to set the operating voltage of the second switching element 23.

The afore the stabilized power supply circuit 24 comprising a DC/DC converter 46, capacitors 47 and 48, Zener diode 49, and reactor 50, generates stabilized power supply, which is fed to the comparison circuit 28 and switching circuit 25.

Now we will describe the operation of this power compensating device for battery by the configuration such as above.

The detection voltage changeover switch 30 and the referential voltage changeover switch 35 select their contacts depending on to what extent the fluctuation in voltage should be controlled in terms of the size of the load 11.

Hereunder we will explain the operation supposing that the contacts A1 and B1 are selected in response to a small load 11.

Since the referential voltage Vr of the five voltage comparators 61 to 65 in the comparison circuit 28 is set at 0.2 V intervals through the selection of the contacts A1 and B1, the indicating lamps 41 to 45 of the display circuit 29 are driven similarly at 0.2 V intervals correspondingly.

As the voltage comparators 61 to 65 have all output at high level, all these indicating lamps 41 to 45 of the display circuit 29 are on at the very start.

The contacts C1 to C5 of the operating point changeover switch 38 are set depending on whether or not the electric charge of the auxiliary capacitor 26 is to be released to the side of the compensating capacitor 12 when the signal voltage Vx arrives at what level.

In the illustrated example, the switch 38 has been set to the contact C3 so that it may come into function when the signal voltage Vx is lower than Vr=0.6 V corresponding to the output of the voltage comparators 63.

When the voltage fluctuation at the point A in the positive side cable 13a is within 0.2 V, that is, when the voltage at the point A is 12.0 to 11.8 V, the signal voltage Vx is 1.0 to 0.8 V, which is lower than the referential voltage Vr=1.0 V of the voltage comparators 65.

Therefore, the voltage comparators 65 outputs to low level with only the indicating lamp 45 going off, and other indicating lamps 41, 42, 43, and 44 all remaining on.

Since, under this condition, the first switching element 22 remains on and the second switching element 23 remains off with the output of high level sent to the switching circuit 25 via the contact C3, there is no electric charge supplied of the auxiliary capacitor 26.

Figure 6:
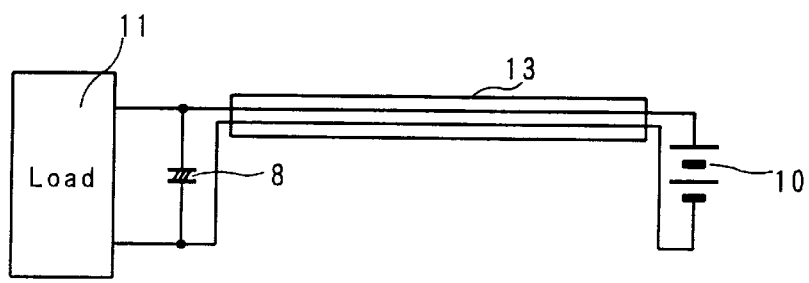
FIG. 6 depicts a circuit diagram showing the conventional power compensating device for battery.

The voltage compensation as in the conventional example shown in FIG. 6 may therefore be performed only with the compensating capacitor 12.

When the voltage fluctuation at the point A becomes slightly higher 0.2 to 0.4 V, that is, when the voltage at this point is 11.8 to 11.6 V, the signal voltage Vx is 0.8 to 0.6 V, which is lower than the referential voltage Vr=0.8 V of the voltage comparators 64. Therefore, the voltage comparators 65 and 64 output to low level with the indicating lamps 45 and 44 going off, and other indicating lamps 41, 42, and 43 all remaining on.

In this case too, the voltage compensation as in the conventional example shown in FIG. 6 may therefore be performed only with the compensating capacitor 12.

Figure 5:
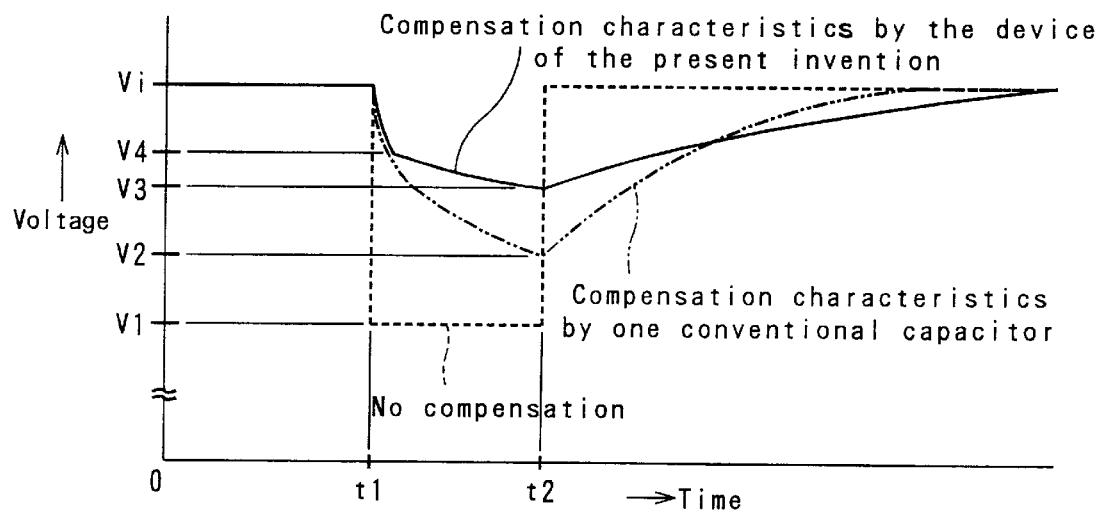
FIG. 5 illustrates the respective operating waveforms in the circuit by this invention, a conventional circuit and a circuit without any compensation for fluctuation in voltage.

If the voltage fluctuation becomes yet higher 0.4 to 0.6 V, as V4 in FIG. 5, namely when the voltage at the point A is 11.6 to 11.4 V, the signal voltage Vx is 0.6 to 0.4 V, which is lower than the referential voltage Vr=0.6 V of the voltage comparators 63.

Therefore, the voltage comparators 65, 64, and 63 output to low level with the indicating lamps 45, 44, and 43 going off, and other indicating lamps 41, and 42 remaining on.

At the same time, the low level output of the voltage comparators 63 turns off the first switching element 22 of the switching circuit 25 via the contact C3 of the operating point changeover switch 38.

This turning off of the first switching element 22 turns on the second switching element 23 with the auxiliary capacitor 26 connected in parallel with the compensating capacitor 12, when the electric charge of the auxiliary capacitor 26 is supplied to the point A to which the compensating capacitor 12 is connected through the second switching element 23.

Thus, the voltage fluctuation may be improved into V3, about the half of the case with the compensating capacitor 12 only as shown by the solid line in FIG. 5.

When the voltage fluctuation is still higher 0.6 to 0.8 V, that is, when the voltage at the point A is 11.4 to 11.2 V, the signal voltage Vx is 0.4 to 0.2 V, which is lower than the referential voltage Vr=0.4 V of the voltage comparators 62. Therefore, the voltage comparators 65, 64, 63, and 62 output to low level with the indicating lamps 45, 44, 43, and 42 going off, and at the same time the low level output of the voltage comparator 63 turns off the first switching element 22 via the contact C3, and turns on the second switching element 23.

Thus, the auxiliary capacitor 26, connected in parallel with the compensating capacitor 12, also contributes to the suppression of the voltage fluctuation.

When the voltage fluctuation exceeds 0.8 V, that is, if the voltage at the point A is lower than 11.2 V, the signal voltage Vx becomes lower than 0.2 V, which is lower than the referential voltage Vr=0.2 V of the voltage comparator 61. Therefore, all the voltage comparators 65, 64, 63, 62, and 61 will output to low level with all the indicating lamps 45, 44, 43, 42, and 41 going off.

At the same time, the low level output of the voltage comparator 63 turns off the first switching element 22 via the contact C3, and turns on the second switching element 23.

Thus, the auxiliary capacitor 26, connected in parallel with the compensating capacitor 12, will also contribute to the suppression of the voltage fluctuation.

The device will thus operate as follows if the operating point changeover switch 38 is set to any out of the contacts C1 to C5 in the case when the contacts A1 and B1 have been selected:

(1) When it is set to C1, the auxiliary capacitor 26 is connected if the voltage fluctuation at the point A is not less than 0.8 V.
(2) When it is set to C2, the auxiliary capacitor 26 is connected if the voltage fluctuation at the point A is not less than 0.6 V.
(3) When it is set to C3, the auxiliary capacitor 26 is connected if the voltage fluctuation at the point A is not less than 0.4 V.
(4) When it is set to C4, the auxiliary capacitor 26 is connected if the voltage fluctuation at the point A is not less than 0.2 V.
(5) When it is set to C5, the auxiliary capacitor 26 is connected even if the voltage fluctuation at the point A is less than 0.2 V.

The operations as above remain the same also when the contacts A2 and B2 are selected as well as the contacts A3 and B3.

It is to be understood that, although in the foregoing embodiment it has been so configured that as the voltage fluctuation grows higher, the voltage comparators output at low level in the sequential order of 65, 64, 63, 62, and 61 with the indicating lamps going off in the order of 45, 44, 43, 42, and 41, this invention should not be limited to such a configuration.

Without departing from the spirit of this invention, other configurations are possible so that if the voltage fluctuation is little all the voltage comparators 65, 64, 63, 62, and 61 may output at low level with all the indicating lamps 45, 44, 43, 42, and 41 going off and that as this voltage fluctuation grows higher the voltage comparators may output at high level in the sequential order of 65, 64, 63, 62, and 61 with the indicating lamps going off in the order of 45, 44, 43, 42, and 41.

In this case the first switching element 22 of the switching circuit 25 should be configured so that it may turn on with the output at low level contrary to the foregoing embodiment.

In the preceding embodiment, the second switching element 23 and the first switching element 22 have been so configured that they may comprise MOSFET, SCR and bipolar transistors in order to reduce as far as possible the thresholds at the switching circuit 25.

Figure 3:
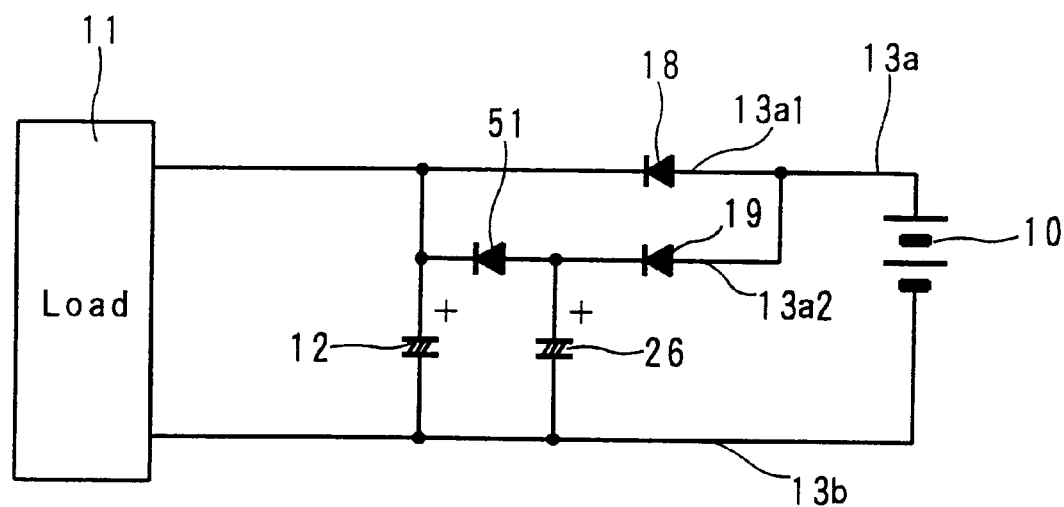
FIG. 3 is another circuit diagram showing the second embodiment of the power compensating device for battery by this invention.
Figure 4:
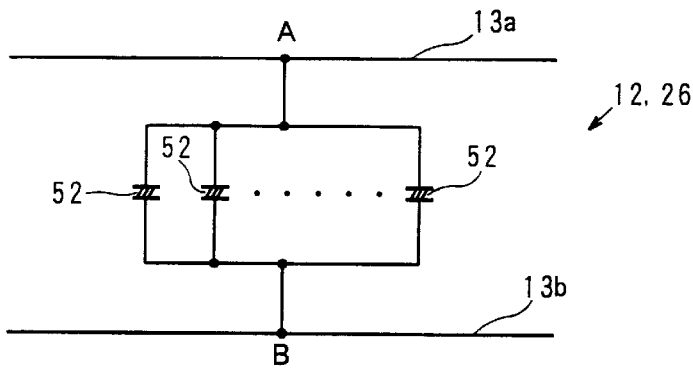
FIG. 4 represents a circuit diagram wherein a number of aluminum electrolytic capacitors of the same rating 52 are connected in parallel into a unit, instead of only one capacitor.

To simplify the circuitry, however, the compensating capacitor 12 and the auxiliary capacitor 26 may be connected to each other through the intermediary of the switching diode 51 as shown in FIG. 3.

The switching diode 51 in this case comes to perform combined operations of the switching circuit 25, voltage detecting circuit 27 and comparison circuit 28 in FIG. 1, and electrifies itself if the potential on the cathode side becomes, by a certain value, lower than that on the anode side to supply the electric charge of the auxiliary capacitor 26 to the side of the compensating capacitor 12.

Although in the foregoing embodiment it has been so illustrated that the compensating capacitor 12 and the auxiliary capacitor 26 consist respectively of a large electrolytic capacitor, it is to be understood that this invention should not be limited to such a configuration. Without departing from the spirit of this invention, several scopes of or more aluminum electrolytic capacitors 52 of the same ratings may be connected in parallel into a unit to have a target capacity.

If n pieces of aluminum electrolytic capacitors 52 are connected in parallel, their internal resistance will be R/n (ohms)×internal resistance of one capacitor.

What is claimed is:

1. A power compensating device for battery, characterized in that it comprises a battery, a cable that connects this battery to a load, a compensating capacitor inserted into the input side of said load, a voltage detecting circuit that detects the fluctuation of the input voltage to said load, a comparison circuit that compares the detected value with the referential value of this voltage detecting circuit, a switching circuit to be controlled by the output of this comparison circuit, and an auxiliary capacitor connected in parallel, by said switching circuit, with said compensating capacitor.

2. A power compensating device for battery having a battery, a cable that connects this battery to a load, a compensating capacitor inserted into the input side of said load, a voltage detecting circuit that detects the fluctuation of the input voltage to said load, a comparison circuit that compares the detected value with the referential value of this voltage detecting circuit, a switching circuit to be controlled by the output of this comparison circuit, and an auxiliary capacitor connected in parallel, by said switching circuit, with said compensating capacitor, characterized in that said switching circuit comprises the first switching element that is on-off controlled by the output signal of said comparison circuit, and the second switching element that is on-off controlled by this first switching element to connect the auxiliary capacitor in parallel with said compensating capacitor.

3. The power compensating device for battery as claimed in claim 1 wherein the cable comprises the positive side cable that connects the positive side of the battery to an end of the load and the negative side cable that connects the negative side of the battery to the other end of the load, characterized in that said positive side cable is branched, between the positive side of the battery and the point A midway thereto, into the first cable and the second cable, the compensating capacitor is connected between said point A and the negative side cable, the auxiliary capacitor is inserted between the midway to said second cable and the negative side cable, and the second switching element is inserted between the auxiliary capacitor in said second cable and the point A.

4. The power compensating device for battery as claimed in claim 3, characterized in that a first recovery diode and fuse are inserted between the positive side of the battery in the first cable and the point A, and a first recovery diode and fuse are inserted between the positive side of the battery in the second cable and the second switching element.

5. The power compensating device for battery as claimed in claim 1, wherein the capacitance ratio of said compensating capacitor to that of auxiliary capacitor is set to the order of 7:3.

6. The power compensating device for battery as claimed in claim 3, wherein the capacitance ratio of said compensating capacitor to that of auxiliary capacitor is set to the order of 7:3.

7. The power compensating device for battery as claimed in claim 1, characterized in that the voltage detecting circuit having a circuit part that can selectively set plural detected values of voltage fluctuation and a circuit part that can selectively set plural referential voltage values, consists, as said circuit part that can selectively set plural detected values of voltage fluctuation, of a series circuit comprising plural Zener diodes of different Zener voltages, the detection voltage changeover switch that changes over these plural Zener diodes and a resistance, and as a circuit part that can selectively set plural referential voltage values, of a series circuit comprising plural resistances, and the referential voltage changeover switch that switches these plural resistances.

8. The power compensating device for battery as claimed in claim 1, characterized in that the voltage detecting circuit having a circuit part that can selectively set plural detected values of voltage fluctuation and a circuit part that can selectively set plural referential voltage values, consists, as said circuit part that can selectively set plural detected values of voltage fluctuation, of a series circuit comprising plural Zener diodes of different Zener voltages, the detection voltage changeover switch that changes over these plural Zener diodes and a resistance, and as a circuit part that can selectively set plural referential voltage values, of a series circuit comprising plural resistances, and the referential voltage changeover switch having three contacts to switch these plural resistances, and the referential voltage source.

9. A power compensating device for battery having a battery, a cable that connects this battery to a load, a compensating capacitor inserted into the input side of said load, a voltage detecting circuit that detects the fluctuation of the input voltage to said load, a comparison circuit that compares the detected value with the referential value of this voltage detecting circuit, a switching circuit to be controlled by the output of this comparison circuit, and an auxiliary capacitor connected in parallel, by said switching circuit, with said compensating capacitor, characterized in that said voltage detecting circuit consists of a circuit portion that can selectively set plural detected values of voltage fluctuation and another circuit portion that can selectively set plural referential voltage values, said comparison circuit has plural voltage comparators, and the referential voltage at these voltage comparators has been so designed as can be set by selecting any out of plural settings of said voltage detecting circuit.

10. The power compensating device for battery as claimed in claim 9, characterized in that the plural voltage comparators that compare multistagedly the voltage fluctuation in the comparison circuit, comprise five voltage comparators, and the respective nodes of series resistances between the power supply and ground are connected to the respective negative terminals of these five voltage comparators to set the referential voltage.

11. The power compensating device for battery as claimed in claim 9, characterized in that the display circuit that displays multistagedly the voltage fluctuation is added to the voltage comparators.

12. The power compensating device for battery as claimed in claim 11, characterized in that the display circuit displaying multistagedly voltage fluctuation that consists of the indicating lamps, has been so designed as operates by the low or high output of the five voltage comparators.

13. The power compensating device for battery as claimed in claim 9, characterized in that the operating point changeover switch is added to the output side of plural voltage comparators in the comparison circuit, and the switching circuit is controlled through the selective output of plural voltage comparators by means of this operating point changeover switch.

14. The power compensating device for battery as claimed in claim 13, characterized in that the operating point changeover switch has five contacts which provided on the output side of five voltage comparators, can be selectively switched.

15. The power compensating device for battery as claimed in claim 1, characterized in that the stabilized power supply circuit is added to the battery, and this stabilized power supply circuit provides the comparison circuit and the switching circuit with the stabilized power supply.

16. The power compensating device for battery as claimed in claim 2, characterized in that the first switching element and second switching element in the switching circuit comprise MOSFET, SCR or bipolar transistor and their thresholds are so designed to be as small as possible.

17. The power compensating device for battery as claimed in claim 1, characterized in that the compensating capacitor and the auxiliary capacitor consist respectively of a single, large-sized electrolytic capacitor.

18. The power compensating device for battery as claimed in claim 1, characterized in that the compensating capacitor and the auxiliary capacitor respectively connect in parallel a number of aluminum electrolytic capacitors of the same rating into a unit to have a target capacity.

19. A power compensating device for battery having a battery, a cable that connects this battery to a load, a compensating capacitor inserted into the input side of said load, a voltage detecting circuit that detects the fluctuation of the input voltage to said load, a comparison circuit that compares the detected value of this voltage detecting circuit with the referential value, a switching circuit to be controlled by the output of this comparison circuit, and an auxiliary capacitor connected in parallel, by said switching circuit, with said compensating capacitor, characterized in that said compensating capacitor and the auxiliary capacitor are connected by means of the switching diode, which performs the combined operations of the switching circuit, the voltage detecting circuit and the comparison circuit into one.

* * * * *